United States Patent
Lee et al.

(10) Patent No.: US 12,153,811 B2
(45) Date of Patent: Nov. 26, 2024

(54) APPARATUS AND METHOD FOR FAST PERSISTENT WRITING TO NONVOLATILE MEMORY

(71) Applicant: ELECTRONICS AND TELECOMMUNICATIONS RESEARCH INSTITUTE, Daejeon (KR)

(72) Inventors: Sang-Min Lee, Daejeon (KR); Hong-Yeon Kim, Daejeon (KR); Baik-Song An, Daejeon (KR); Myung-Hoon Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/903,110

(22) Filed: Sep. 6, 2022

(65) Prior Publication Data

US 2023/0168828 A1  Jun. 1, 2023

(30) Foreign Application Priority Data

Nov. 30, 2021 (KR) .................. 10-2021-0168324

(51) Int. Cl.
G06F 3/06 (2006.01)

(52) U.S. Cl.
CPC ............ *G06F 3/064* (2013.01); *G06F 3/0679* (2013.01); *G06F 3/0604* (2013.01)

(58) Field of Classification Search
None
See application file for complete search history.

(56) References Cited

U.S. PATENT DOCUMENTS

| | | | |
|---|---|---|---|
| 9,880,762 B1* | 1/2018 | Armangau | G06F 3/067 |
| 10,296,422 B1* | 5/2019 | Sarda | G06F 11/1471 |
| 10,437,474 B1* | 10/2019 | Armangau | G06F 3/061 |
| 2005/0071593 A1* | 3/2005 | Vincent | G06F 16/1815 |
| | | | 711/156 |
| 2005/0262170 A1* | 11/2005 | Girkar | G06F 16/273 |

(Continued)

FOREIGN PATENT DOCUMENTS

KR    10-2020-0060220 A    5/2020

OTHER PUBLICATIONS

Jian Xu et al., "Finding and Fixing Performance Pathologies in Persistent Memory Software Stacks", Proceedings of the Twenty-Fourth International Conference on Architectural Support for Programming Languages and Operating Systems, 2019.

*Primary Examiner* — Yaima Rigol

(57) ABSTRACT

Disclosed herein are an apparatus and method for processing fast persistent writing to nonvolatile memory. A method for processing fast persistent writing to a nonvolatile memory includes writing log data from a last storage position in a data block created in a certain size, reflecting the entire data block in a storage medium, increasing the last storage position by a size of the written log data, and reflecting the entire data block in a storage medium, wherein the data block is linearly linked to an additional data block in a creation order, and wherein the data block includes a log data storage region, information about a last storage position where the log data is stored in the log data storage region, and information about a linked next data block.

16 Claims, 7 Drawing Sheets

(56) References Cited

U.S. PATENT DOCUMENTS

| | | | |
|---|---|---|---|
| 2007/0106679 A1* | 5/2007 | Perrin | G06F 16/10 |
| 2009/0113112 A1 | 4/2009 | Ye | |
| 2011/0060864 A1* | 3/2011 | Yoshii | G06F 3/061 |
| | | | 711/E12.001 |
| 2012/0284295 A1* | 11/2012 | Wang | G06F 16/24539 |
| | | | 707/769 |
| 2013/0024722 A1* | 1/2013 | Kotagiri | G06F 3/065 |
| | | | 714/6.1 |
| 2013/0046918 A1* | 2/2013 | Im | G06F 12/0246 |
| | | | 711/E12.001 |
| 2013/0326117 A1* | 12/2013 | Aune | G06F 3/064 |
| | | | 711/E12.008 |
| 2015/0142860 A1* | 5/2015 | George | G06F 11/14 |
| | | | 707/812 |
| 2016/0378368 A1* | 12/2016 | Ash | G06F 3/0655 |
| | | | 710/22 |
| 2017/0193005 A1* | 7/2017 | Won | G06F 16/27 |
| 2017/0212690 A1* | 7/2017 | Babu | G06F 3/0685 |
| 2018/0284995 A1 | 10/2018 | Dantkale | |

\* cited by examiner

APPARATUS AND METHOD FOR FAST PERSISTENT WRITING TO NONVOLATILE MEMORY

CROSS REFERENCE TO RELATED APPLICATION

This application claims the benefit of Korean Patent Application No. 10-2021-0168324, filed Nov. 30, 2021, which is hereby incorporated by reference in its entirety into this application.

BACKGROUND OF THE INVENTION

1. Technical Field

The following embodiments relate to technology for optimizing persistent writing in a transaction system.

2. Description of the Related Art

In general, log (redo or undo)-based transaction processing is performed for systematic maintenance and management of system data, thereby ensuring atomicity and consistency.

For this, writing log data for transactions to a storage medium, i.e., permanent writing, needs to be ensured. Hence, completion of one transaction needs to wait until writing to the storage medium is completed, so performance of permanent writing for which data recording is followed by data reflection in a storage device makes a significant impact on transaction processing performance.

In the meantime, as a next-generation memory, large-capacity nonvolatile memory such as Intel® 3D XPoint Optane memory has been commercialized. The nonvolatile memory ensures low-latency access time and high bandwidth compared to the traditional hard disk drive (HDD) and the solid-state drive (SSD). When this type of memory is used for a storage medium, the low-latency access time may make it possible to secure fast transaction processing performance.

However, to make the most of the advantages of nonvolatile memory in transaction processing, log writing needs to be analyzed.

To perform metadata process request in transactions, logs need to be recorded in a storage medium through a local file system such as EXT4 or XFS. However, an additional journal writing task is performed for the log recording because its own file system updates the metadata, i.e., initializes a file allocation table, a file size, and data. Hence, there is a limit to making the most of the advantage of the fast nonvolatile memory, i.e., the low latency thereof.

Furthermore, such an additional journal data writing task does not greatly reduce the performance of relatively slow storage media such as HDD or SSD but causes a significant reduction in the performance of fast storage devices such as the nonvolatile memory.

SUMMARY OF THE INVENTION

An embodiment is intended to attain fast transaction performance of a file system by performing log writing to fast nonvolatile memory without additional journal writing.

In accordance with an aspect, there is provided an apparatus for processing fast persistent writing to a nonvolatile memory, the apparatus including a memory for storing at least one program, and a processor for executing the program, wherein the program is configured to perform sequential log data writing to a data block created in a certain size, and wherein the data block is linearly linked to an additional data block in a creation order.

The data block may include a log data storage region, information about a last storage position where log data is stored in the log data storage region, and information about a linked next data block.

Here, the program may be configured to perform, in performing the log data writing, writing log data from a last storage position in the data block, reflecting the entire data block in a storage medium, increasing the last storage position by a size of the written log data, and reflecting the entire data block in the storage medium.

A header of the data block may include information about linked data blocks, and the information may include a first block, a last block, a number of data blocks, and a data block size.

The program may be configured to perform log data writing to an available space in a data block corresponding to the last block.

The program may be configured to perform, when the number of data blocks is 0 or a size of the available space in the data block corresponding to the last block is smaller than a log data size, newly creating a data block before the log data writing is performed.

The program may be configured to perform, in newly creating the data block, creating a file to be used for a data block, extending the created file by a unit block size, initializing the created file, and reflecting the initialized file in a storage medium.

The program may be configured to perform, in newly creating the data block, updating header information by reflecting the newly created data block.

The program may be configured to perform, in updating the header information, setting the first block and the last block to the newly created data block when the number of data blocks is 0, and increasing the number of data blocks by one.

The program may be configured to perform, in updating the header information, setting a next block linked to the data block corresponding to the last block to the newly created data block when the number of data blocks is not 0, updating the last block to the newly created data block, and increasing the number of data blocks by one.

In accordance with another aspect, there is provided a method for processing fast persistent writing to a nonvolatile memory, the method including writing log data from a last storage position in a data block created in a certain size, reflecting the entire data block in a storage medium, increasing the last storage position by a size of the written log data, and reflecting the entire data block in the storage medium, wherein the data block is linearly linked to an additional data block in a creation order, and wherein the data block comprises a log data storage region, information about a last storage position where the log data is stored in the log data storage region, and information about a linked next data block.

A header of the data block may include information about linked data blocks, and the information may include a first block, a last block, a number of data blocks, and a data block size.

Writing the log data may include writing log data to an available space in a data block corresponding to the last block.

The method may further include, when the number of data blocks is 0 or a size of the available space in the data block corresponding to the last block is smaller than a log data size, newly creating a data block before the log data writing is performed.

Newly creating the data block may include creating a file to be used for a data block, extending the created file by a unit block size, initializing the created file, and reflecting the initialized file in a storage medium.

Newly creating the data block may include updating header information by reflecting the newly created data block.

Updating the header information may include setting the first block and the last block to the newly created data block when the number of data blocks is 0, and increasing the number of data blocks by one.

Updating the header information may include setting a next block linked to the data block corresponding to the last block to the newly created data block when the number of data blocks is not 0, updating the last block to the newly created data block; and increasing the number of data blocks by one.

In accordance with a further aspect, there is provided a method for reading log data from a nonvolatile memory, the method including sequentially reading log data from a first block of data blocks linearly linked in a creation order, and sequentially reading log data from a data block set to a next block linked to a data block from which log data reading is completed, wherein the data block comprises a log data storage region, information about a last storage position where log data is stored in the log data storage region, and information about a linked next data block, and wherein sequentially reading the log data is repeatedly performed until there is no subsequent block linked to a data block from which log data reading is completed, Sequentially reading the log data may include reading log data of a certain size unit from the data block up to the last storage position.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
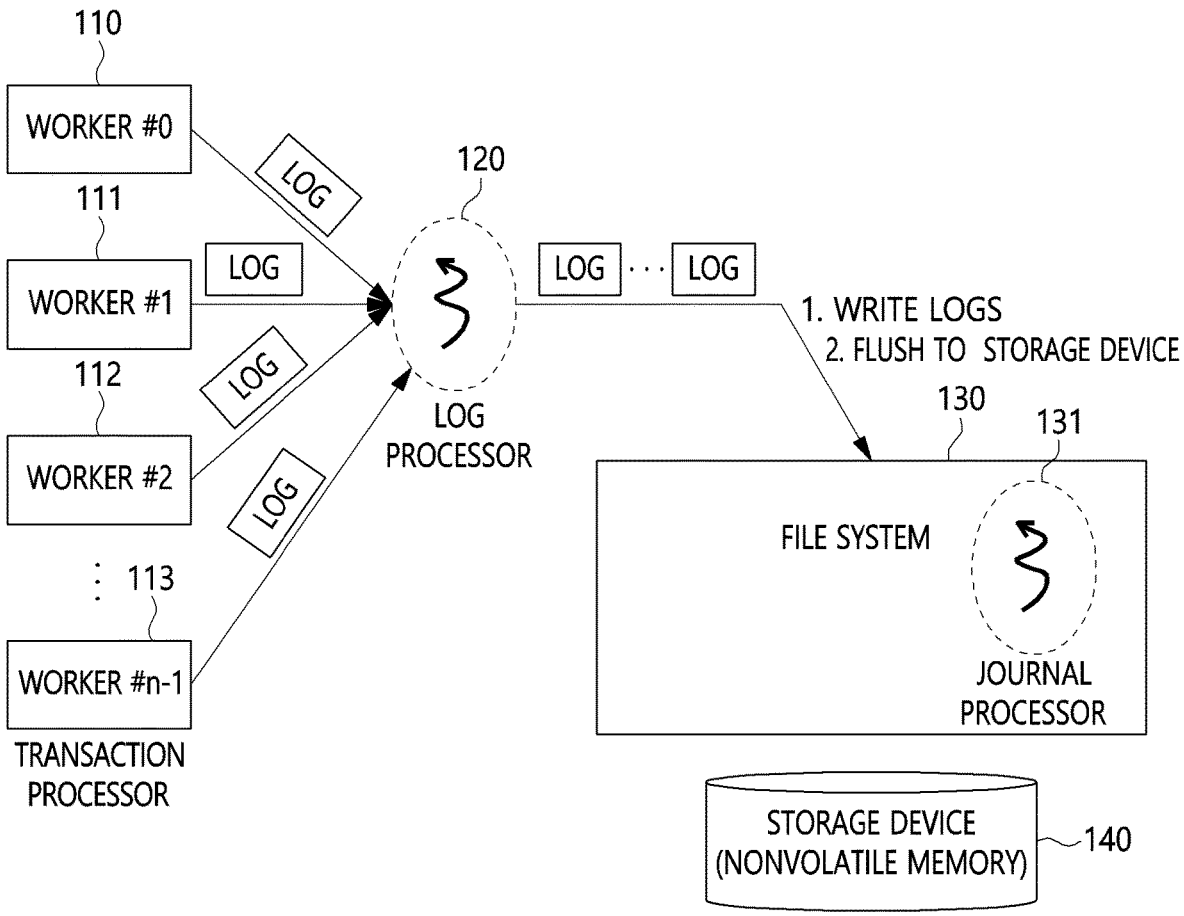
FIG. 1 is a diagram illustrating a general transaction processing structure.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for processing fast persistent writing to nonvolatile memory according to embodiments will be described in detail with reference to FIGS. 1 to 10.

FIG. 1 is a diagram illustrating a general transaction processing structure.

Referring to FIG. 1, each of multiple workers 110 to 113 who receives an instruction to process a user request from a server creates a log, which is a result of processing the request, in memory as to perform transaction processing, sends the log to a log processor 120 to write the log to a storage medium 140, and then waits until the writing is completed.

Then, the log processor 120 then performs file writing (write( )) of the logs requested to be written, requests (fsync( ), fdata_sync( )) this to be reflected in the storage medium 140, and wait until the disc reflection is completed.

In this existing method, logs are constantly added to one file, so the size of the file grows. Hence, updating metadata of the file (e.g., initialization of a file allocation table, a file size, and data) causes addition of journal data. Accordingly, each time a log data writing task is performed, a journal data writing task therefor needs to be additionally performed. Specifically, the log data may be actually reflected in the storage medium 140 only when the journal data writing task in which a journal processor 131 of a file system 130 records the additional journal data to the storage medium 140 is completed.

This additional journal data writing task does not greatly reduce the performance of relatively slow storage media (e.g., a hard disk drive (HDD) or a solid-state drive (SSD)), but causes a significant reduction in the performance of fast storage devices such as the nonvolatile memory.

To solve the above-described problem with conventional journal data writing, an embodiment of the disclosure proposes a linked data structure for the nonvolatile memory and an apparatus and method for performing log data writing based on the linked structure.

Figure 2:
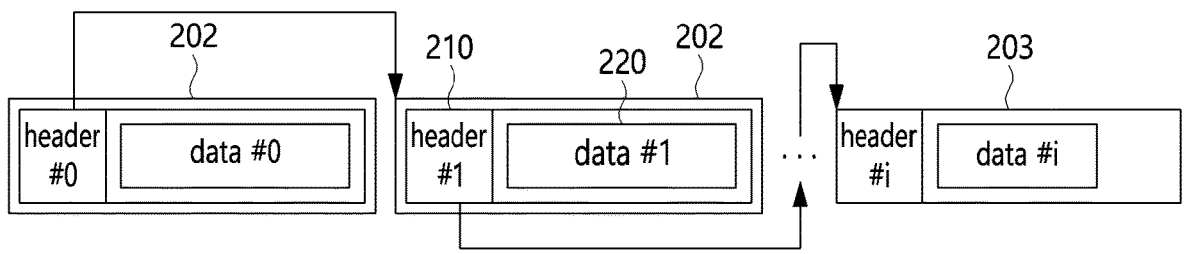
FIG. 2 is a diagram illustrating an example of a linked data structure for nonvolatile memory according to an embodiment.

FIG. 2 is a diagram illustrating an example of a linked data structure for nonvolatile memory according to an embodiment.

Referring to FIG. 2, instead of constantly adding logs to one file, log data writing is sequentially performed to pre-created data blocks 201, 202, and 203 having a certain size. Accordingly, in the embodiment, updating metadata of a file system is performed only once when the data block is created, and there is no need to update the metadata when a log is added.

In this case, a data block is linearly linked to another data block in the creation order. Accordingly, multiple linearly linked data blocks 201, 202 and 203 may be managed as a whole.

In this case, a header 210 of the data block may include information about the linked data blocks 201, 202, and 203.

Figure 3:
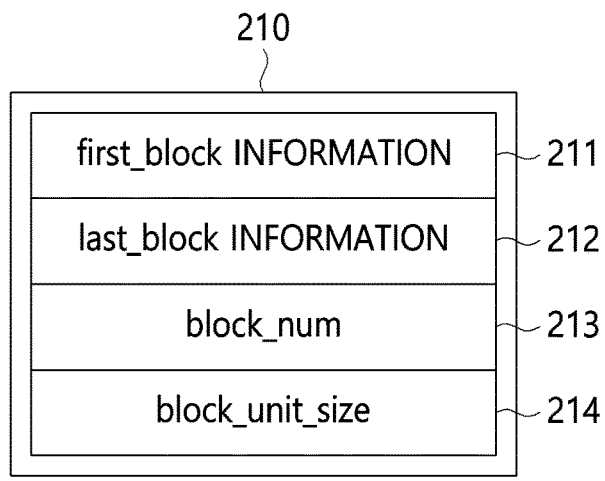
FIG. 3 is a diagram illustrating the structure of a header of a data block according to an embodiment.

FIG. 3 is a diagram illustrating the structure of a header of a data block according to an embodiment.

Referring to FIG. 3, the header 210 of the data block may include first block (first_block) information 211, last block (last_block) information 212, the number of data blocks (block_num) 213, and a data block size (block_unit_size) 214.

Figure 4:
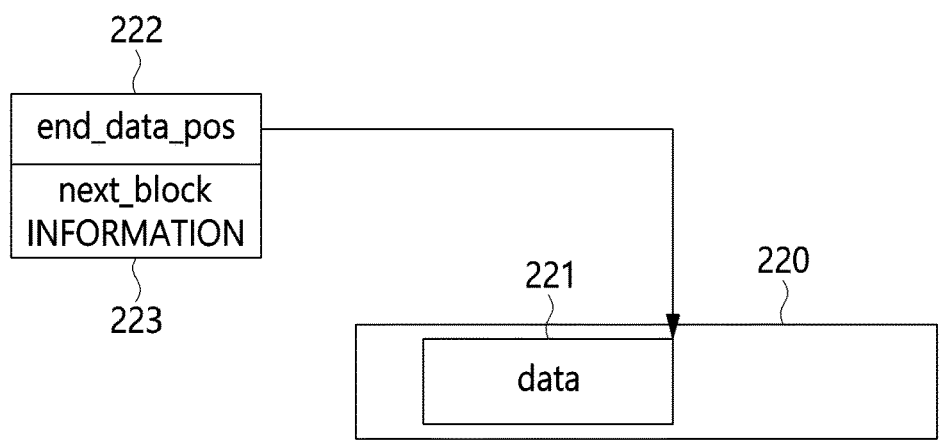
FIG. 4 is a diagram illustrating the structure of a data block that stores actual log data according to an embodiment.
Figure 5:
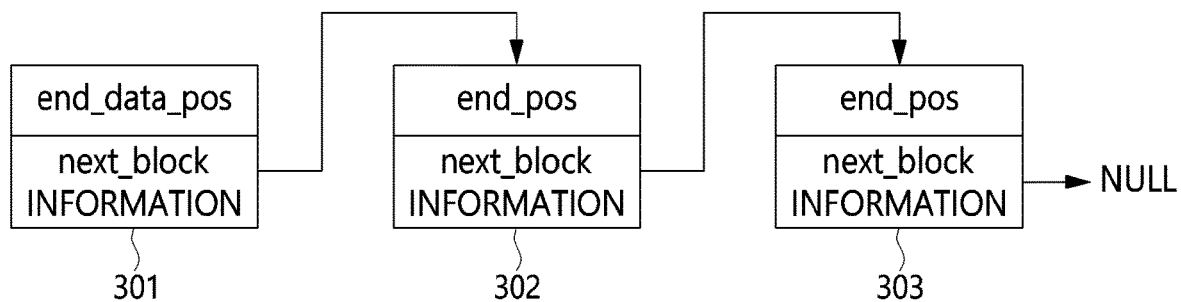
FIG. 5 is a diagram illustrating a link between data blocks that store actual log data according to an embodiment.

FIG. 4 is a diagram illustrating the structure of a data block that stores actual log data according to an embodiment, and FIG. 5 is a diagram illustrating a link between data blocks that store actual log data according to an embodiment.

Referring to FIG. 4, a data block 220 that stores actual log data may include a log data storage region (data) 221, information about a last storage position (end_pos) 222 of the log data in the log data storage region, and information about a linked next data block (next_block) 223.

Referring to FIG. 5, multiple data blocks 301, 302 and 303 may be sequentially linked based on next data block (next_block) information.

A method for processing fast persistent writing to nonvolatile memory based on the linked data structure according to an embodiment will now be described in detail with reference to FIGS. 6 to 8.

Figure 6:
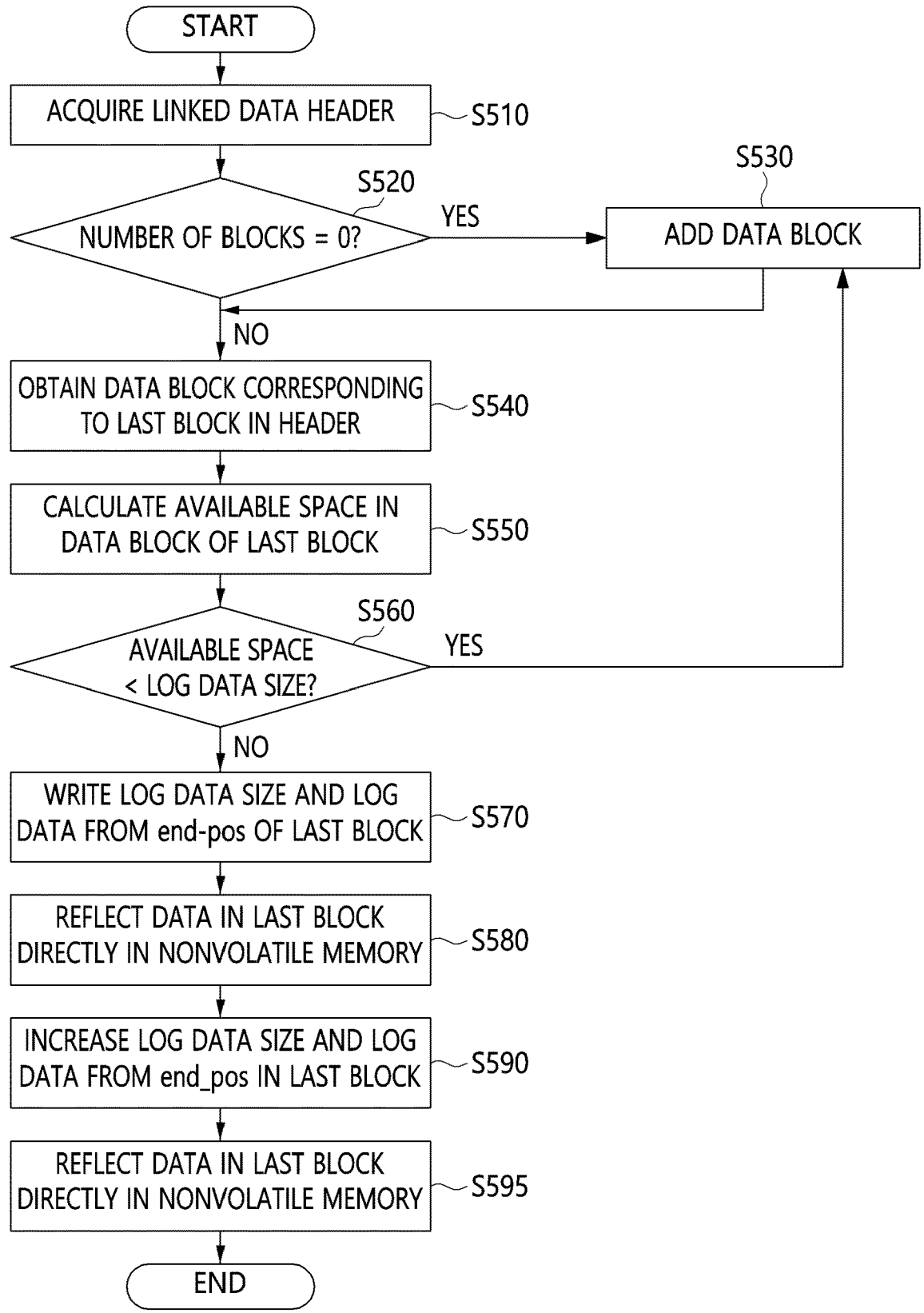
FIG. 6 is a flowchart for explaining a method of processing fast persistent writing to nonvolatile memory according to an embodiment.
Figure 7:
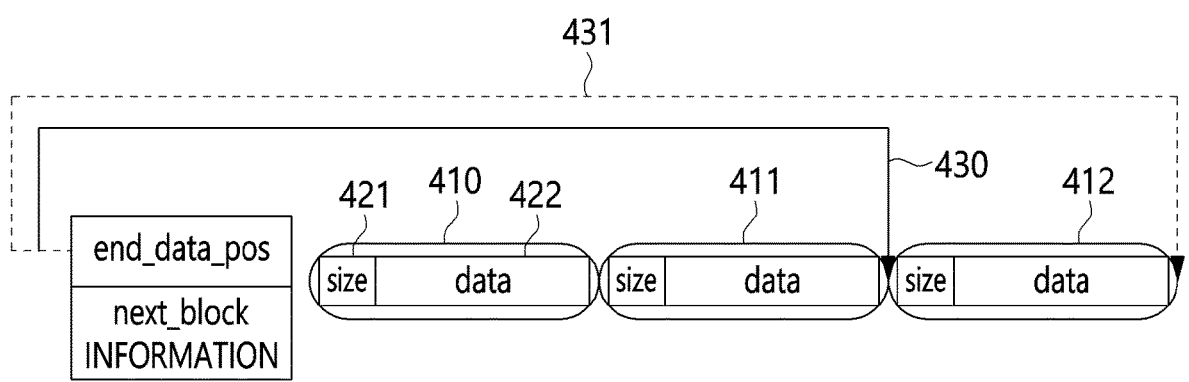
FIG. 7 is a diagram illustrating writing of log data to a data block according to an embodiment.

FIG. 6 is a flowchart for explaining a method of processing fast persistent writing to nonvolatile memory according to an embodiment, and FIG. 7 is a diagram illustrating writing of log data to a data block according to an embodiment.

Referring to FIG. 6, the apparatus for processing fast persistent writing to nonvolatile memory (hereinafter, simply referred to as "the apparatus") first acquires a header of a data block at step S510. The apparatus then determines whether the number of data blocks (block_num) set in the header is 0 at step S520.

When the number of data blocks is determined at step S520 to be 0, the apparatus newly creates a data block at step S530 and proceeds to step S540.

Otherwise, when it is determined at step S520 that the number of data blocks is not 0, writing of log data may be performed in an available space in a data block corresponding to the last of the created and linked data blocks.

In other words, the apparatus reads the data block corresponding to the last block set in the header at step S540 and calculates the available space in the data block at step S550. In this case, the available space may be calculated using the equation of block_unit_size-data block header size-end_pos.

The apparatus then compares the calculated available space in the data block with the size of log data at step S560.

When the result of the comparing at step S560 reveals that the calculated available space in the data block is smaller than the size of the log data, the apparatus newly creates a data block at step S530 and proceeds to step S540.

Otherwise, when the result of the comparing at step S560 reveals that the calculated available space in the data block is larger than the size of the log data, the apparatus writes log data from the last storage position (end_pos) in the data block at step S570. Referring to FIG. 7, log data 412 is written from the position indicated as the last storage position (end_pos) 430. In this case, log data 410 may include log data size information 421 and actual log data 422.

Subsequently, the apparatus reflects the entire data block in a storage medium at step S580.

The apparatus then increases the last storage position by the size of the written log data at step S590. Referring to FIG. 7, an ending position after the log data 412 is added may be set (431) to the last storage position (end_pos).

Subsequently, the apparatus reflects the entire data block in the storage medium at step S595.

In the meantime, as described above, when it is determined that the number of data blocks is 0 at step S520 or when it is determined that the size of the available space in the data block corresponding to the last block is smaller than the size of the log data at step S560, a data block may be newly created before log data writing is performed at step S530.

Figure 8:
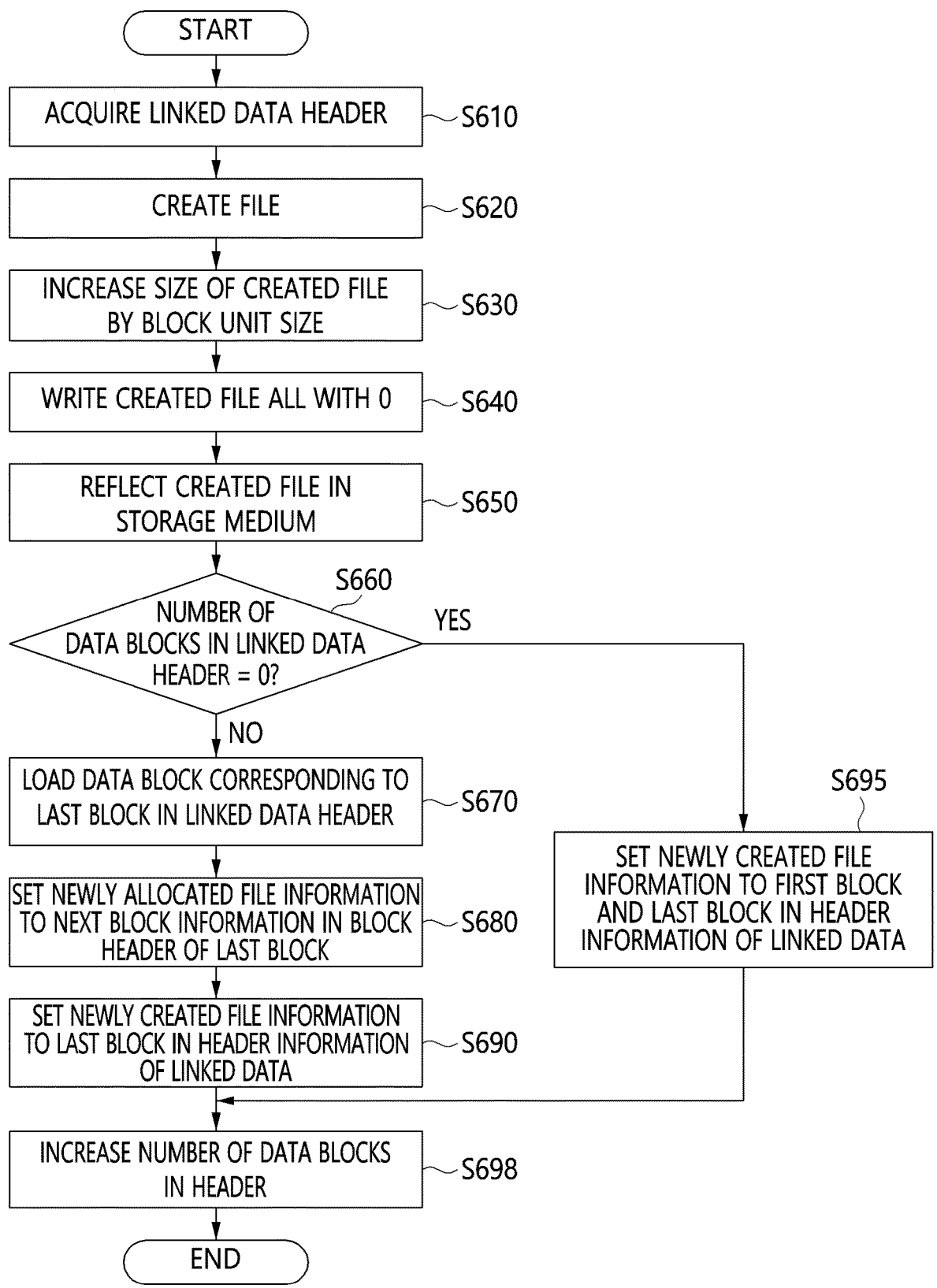
FIG. 8 is a flowchart for explaining the step of newly creating a data block according to an embodiment.

FIG. 8 is a flowchart for explaining the step of newly creating a data block according to an embodiment.

Referring to FIG. 8, the apparatus acquires a header of a data block at step S610. The apparatus creates one file to be used for a data block at step S620 and extends the size of the created file by the size of the data block (block unit size) recorded in the header at step S630.

The apparatus then initializes the entire created file with zeroes ('0') at step S640 and reflects it in a storage medium at step S650.

Subsequently, the apparatus updates the header information by reflecting the newly created data block at steps S660 to S698.

Specifically, the apparatus determines whether the number of blocks recorded in the current header is 0, at step S660.

When it is determined at step S660 that the number of data blocks is not 0, the apparatus loads a data block corresponding to the last block recorded in the header of the data block at step S670.

After this, the apparatus sets a next block linked to the data block corresponding to the last block to the newly created data block at step S680, and updates the last block with the newly created data block at step S690.

Otherwise, when it is determined at step S660 that the number of data blocks is 0, the apparatus sets the first block and the last block in the header to the newly created data block at step S695.

Subsequently, the apparatus increases the number of data blocks by one at step S698.

Figure 9:
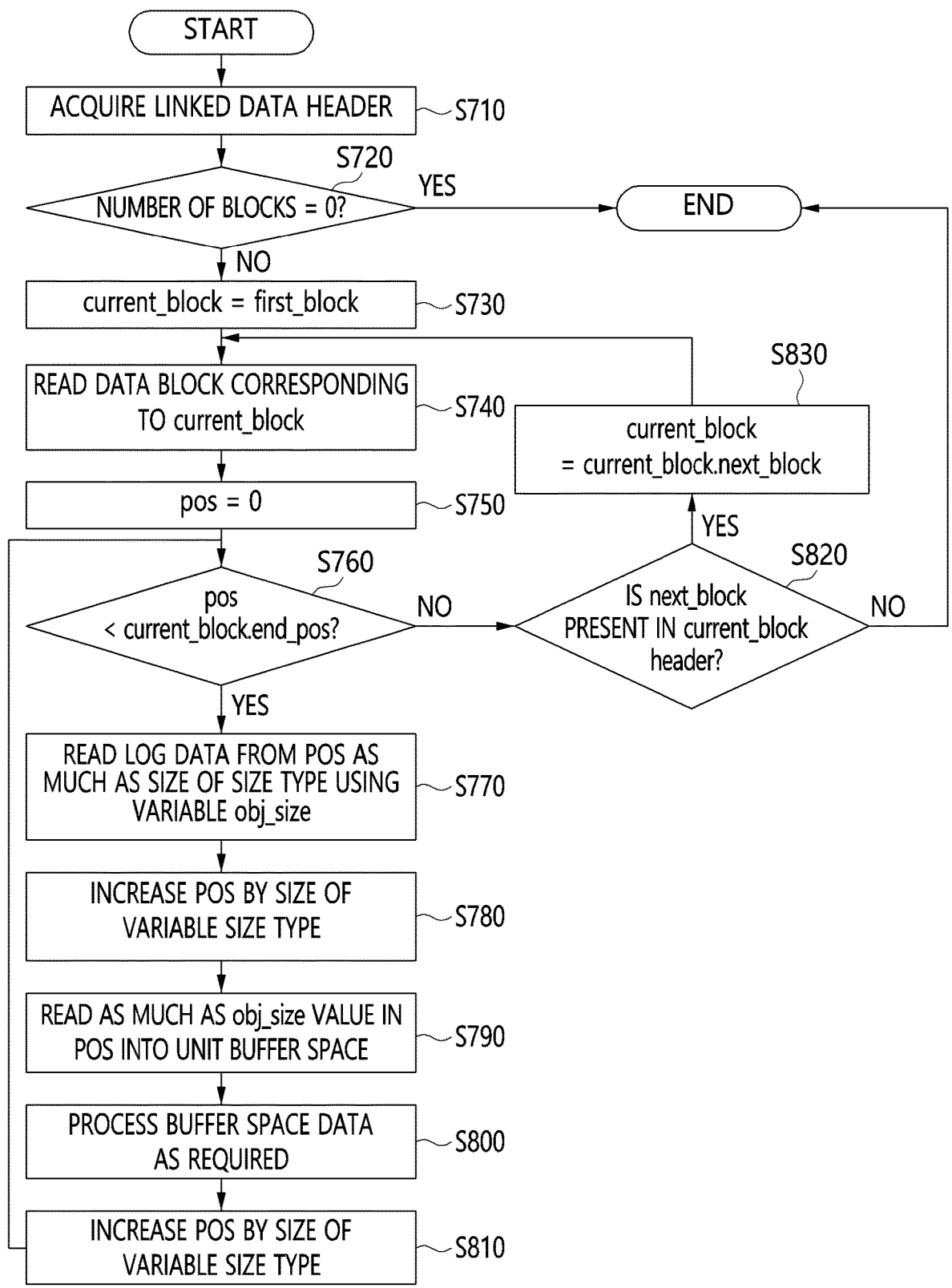
FIG. 9 is a flowchart for explaining a method for reading log data from a nonvolatile memory according to an embodiment.

FIG. 9 is a flowchart for explaining a method for reading log data from nonvolatile memory according to an embodiment.

Referring to FIG. 9, the apparatus reads a header of linked log data, at step S710. The apparatus then determines whether the number of all data blocks (block_num) set in the header is 0 at step S720.

When it is determined at step S720 that the number of data blocks is 0, log data reading is completed.

Otherwise, when it is determined at step S720 that the number of data blocks is not 0, the apparatus sequentially reads log data from the first block of the data blocks.

Specifically, the apparatus sets the current block (current_block) to the first block (first_block) at step S730.

The apparatus then reads a data block corresponding to the current block at step S740, and initializes the position (pos) to 0 at step S750 to prepare log writing.

Subsequently, at steps S760 to S810 for sequentially reading log data, log data of a certain size unit may be read from the data block up to the last storage position (end_pos).

Specifically, the apparatus determines whether a value corresponding to the position (pos) is smaller than a value corresponding to the last storage position of the current block (current_block.end_ps) at step S760.

When it is determined at step S760 that the value corresponding to the position (pos) is smaller than the value corresponding to the last storage position of the current block, the apparatus reads log data from the position (pos) as much as a size of a certain size type using a variable obj_size at step S770, and increases the position (pos) by the size of the certain size type at step S780.

The apparatus then reads an amount of log data corresponding to the value of obj_size into a unit buffer space at step S790 and processes the data in the buffer space as required at step S800.

Subsequently, log data is sequentially read from a data block set to a next block linked to a data block from which log data reading is completed.

In the meantime, when it is determined at step S760 that the value corresponding to the position (pos) is larger than the value corresponding to the last storage position of the current block, the apparatus determines that log data reading is completed for the current block and reads log data of the next block linked to the data block from which log data reading is completed.

In other words, the apparatus determines whether there is next block (next_block) information in the header of the current block (current_block) at step S810.

When it is determined at step S810 that there is next data block (next_block) information, the apparatus sets the next data block (next_block) to the current data block (current_block) at step S820. Subsequently, the apparatus repeatedly performs steps S740 to S830 until no next data block (next_block) is present.

Figure 10:
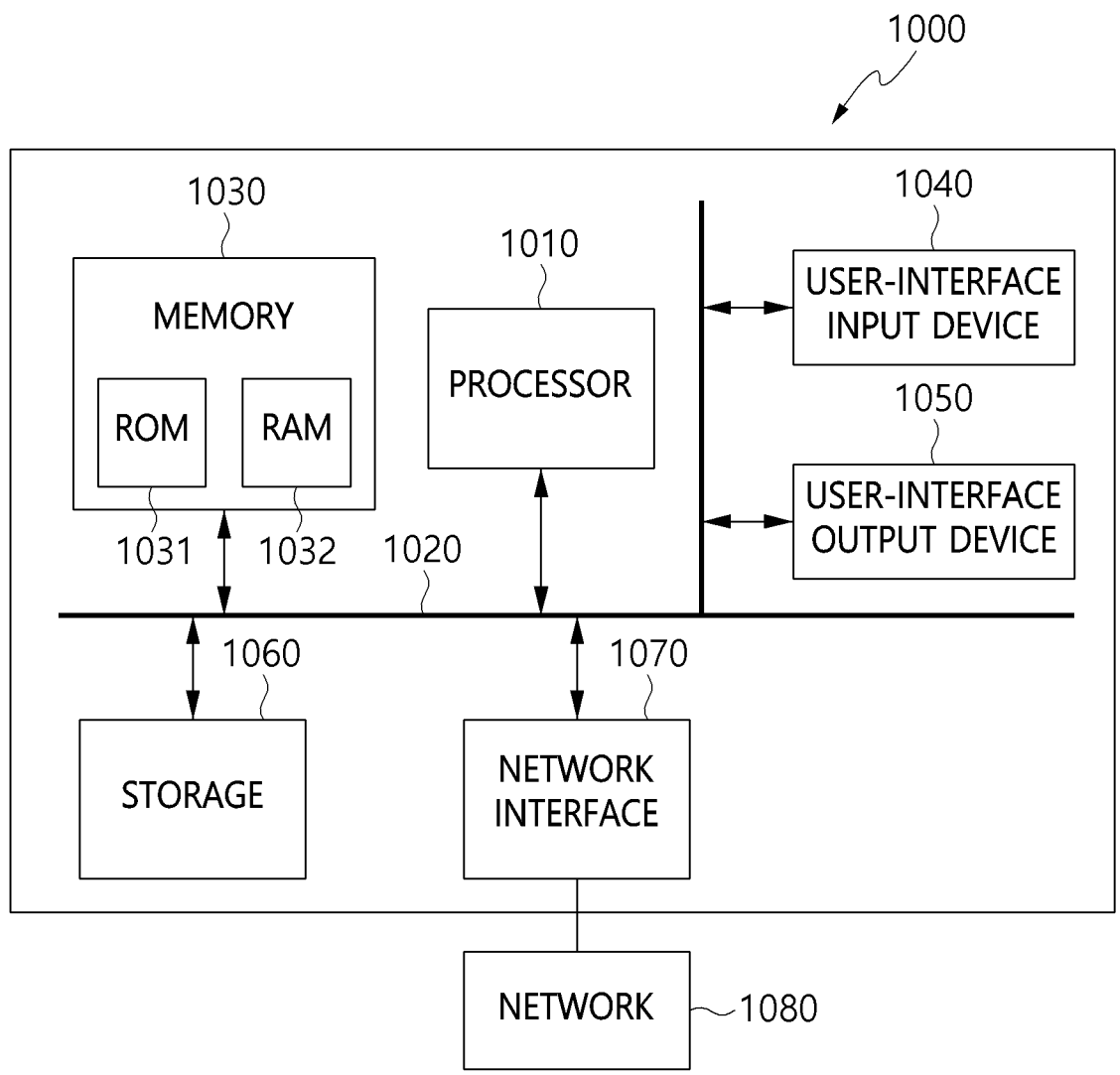
FIG. 10 is a block diagram illustrating the configuration of a computer system according to an embodiment.

FIG. 10 is a block diagram of a computer system according to an embodiment of the disclosure.

In the embodiment, the apparatus for processing fast persistent writing to nonvolatile memory may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with embodiments, high performance may be secured when the present invention is applied to an existing transaction system such as a database (DB) or in-memory DB. Therefore, because more loads may be processed compared to existing schemes, better performance per price may be obtained through the same system compared to the existing schemes.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An apparatus for processing fast persistent writing to a nonvolatile memory, the apparatus comprising:
   a memory for storing at least one program; and
   a processor for executing the program,
   wherein the program is configured to:
   perform sequential log data writing by:
   in response to an available space in a first data block in a file system being not less than a size of the log data, writing, without updating metadata of the file system, the sequential log data to the first data block; and
   in response to the available space in the first data block being less than the size of the log data:
   creating a second data block, creating the second block including updating the metadata of the file system,
   writing next block information corresponding to the second data block in the first data block, and
   writing, without updating the metadata of the file system, the sequential log data to the second data block,
   wherein the first data black block and the second data block are created in a certain size, and
   wherein the first data block is linearly linked to the second data block in a creation order.

2. The apparatus of claim 1, wherein the first data block comprises a log data storage region and information about a last storage position where log data is stored in the log data storage region.

3. The apparatus of claim 2, wherein the program is configured to perform, in performing the log data writing,
   writing log data from a last storage position in the first data block;
   reflecting the entire first data block in a storage medium;
   increasing the last storage position by a size of the written log data; and
   reflecting the entire first data block in the storage medium.

4. The apparatus of claim 2, wherein:
   a header of the first data block includes information about linked data blocks, and the information includes a first block, a last block, a number of data blocks, and a data block size.

5. The apparatus of claim 4, wherein the program is configured to perform log data writing to an available space in a data block corresponding to the last block.

6. The apparatus of claim 5, wherein the program is configured to perform:
creating the first data block;
creating in the filesystem a file to be used for containing the first data block;
extending the created file by a unit block size;
initializing the created file; and
reflecting the initialized file in a storage medium.

7. The apparatus of claim 6, wherein creating the first data block includes updating header information by reflecting the first data block, and wherein creating the second data block includes updating the header information by reflecting the second data block.

8. The apparatus of claim 7, wherein updating the header information as part of creating a data block includes:
setting the first block and the last block to the data block being created when the number of data blocks is 0; and
increasing the number of data blocks by one.

9. The apparatus of claim 7, wherein updating the header information as part of creating a data block includes:
setting a next block linked to the data block corresponding to the last block to the data block being created when the number of data blocks is not 0;
updating the last block to the data block being created; and
increasing the number of data blocks by one.

10. A method for processing fast persistent writing to a nonvolatile memory, the method comprising:
creating a first data block in a certain size;
in response to an available space in a first data block being not less than a size of log data:
writing, without updating metadata of a file system, log data from a last storage position in the first data block;
reflecting the entire first data block in a storage medium;
increasing the last storage position by a size of the written log data; and
reflecting the entire data block in the storage medium, and
in response to the available space in the first data block being less than a size of log data:
creating a second data block, creating the second block in the certain size, wherein creating the second data block includes updating the metadata of the file system,
writing next block information corresponding to the second data block in the first data block, and
writing, without updating the metadata of the file system, the log data to the second data block,
wherein the first data block is linearly linked to the second data block in a creation order, and
wherein the data block comprises a log data storage region, information about a last storage position where the log data is stored in the log data storage region, and information about a linked next data block.

11. The method of claim 10, wherein:
a header of the first data block includes information about linked data blocks, and
the information includes a first block, a last block, a number of data blocks, and a data block size.

12. The method of claim 11, wherein writing the log data comprises writing log data to an available space in a data block corresponding to the last block.

13. The method of claim 12, wherein creating the first data block comprises:
creating in the filesystem a file to be used for the first data block;
extending the created file by a unit block size;
initializing the created file; and
reflecting the initialized file in a storage medium.

14. The method of claim 13, wherein creating a data block comprises updating header information by reflecting the data block being created.

15. The method of claim 14, wherein updating the header information comprises:
setting the first block and the last block to the data block being created in response to the number of data blocks being 0; and
increasing the number of data blocks by one.

16. The method of claim 14, wherein updating the header information comprises:
setting a next block linked to the data block corresponding to the last block to the data block being created in response to the number of data blocks being not 0;
updating the last block to the data block being created; and
increasing the number of data blocks by one.

* * * * *